Sept. 14, 1926.
P. F. LEVERENZ
1,599,478
TRACTOR WHEEL
Filed Nov. 2, 1925
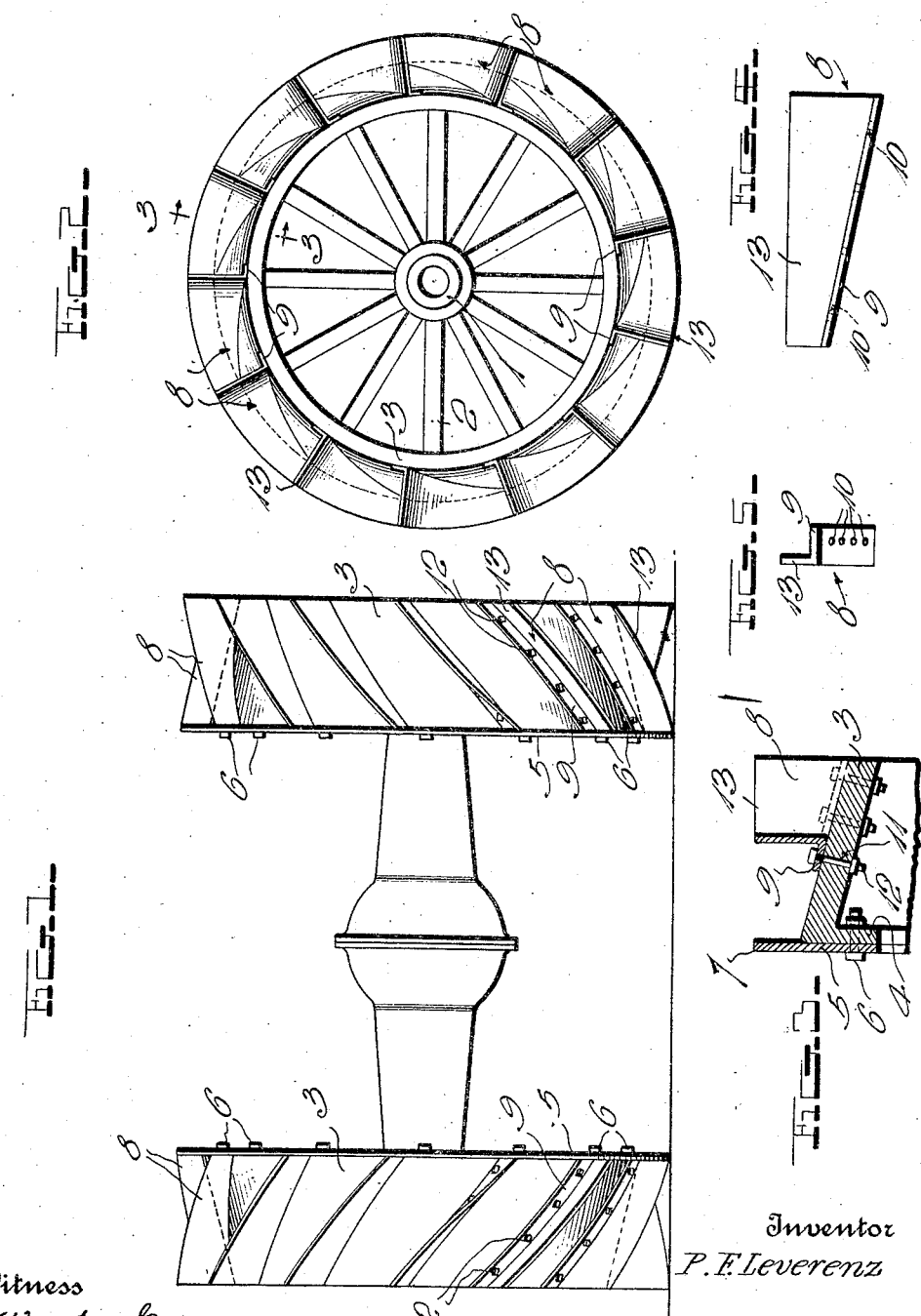
Inventor
P. F. Leverenz
Witness
H. Woodard
By H. B. Wilson & Co.
Attorneys Patented Sept. 14, 1926.

1,599,478

UNITED STATES PATENT OFFICE.

PAUL F. LEVERENZ, OF TEMPLETON, CALIFORNIA.

TRACTOR WHEEL.

Application filed November 2, 1925. Serial No. 66,330.

My invention relates to improvements in wheels and more particularly to the driving or traction wheels of tractors, though it is to be understood that the use of this invention is not so limited, but may be employed in connection with other machines or vehicles.

An object of this invention is to provide means for eliminating packing of soil between the cleats or grousers and to provide further means for eliminating the side slipping or skidding of the wheels when a tractor is being operated upon a hillside.

A further object is to so construct a tractor wheel as to positively prevent locking of the wheel on a root or the like which quite frequently results in complete turning over of the tractor and consequent serious injury to the operator.

It is likewise an object to construct a tractor wheel which, instead of packing the soil, will serve to break it up due to the slicing action of the grousers or cleats arranged upon the periphery of the rim.

With the foregoing and minor objects in view, the invention resides in the novel subject matter hereinafter described and claimed, the description being supplemented by the accompanying drawing.

Figure 1 is a front elevation of a pair of tractor wheels constructed in accordance with my invention;

Figure 2 is a side elevation thereof;

Figure 3 is a transverse sectional view of a portion of the rim;

Figure 4 is a side elevation of one of the grousers or cleats; and

Figure 5 is an end elevation of one of the grousers or cleats.

As illustrated, this traction wheel comprises the usual hub 1 having radiating spokes 2 at the outer ends of which is arranged a rim 3. Preferably this rim is declined transversely from its inner to its outer side, and this inner side, which is of the greater diameter, is provided with an inwardly extending annular flange 4 to which is preferably removably fixed a radial rim flange 5, removable attachment being effected by means of bolts 6 or the like elements. As shown in Fig. 3, the outer portion 7 of this rim flange 5 extends beyond the outer face of the rim 3 for a purpose which will be apparent.

Separably attached to the outer side or face of the rim 3 is a set of circumferentially spaced transversely inclined grousers or cleats 8 which are subtsantially L-shaped in cross-section. The base flange 9 of these grousers or cleats is provided with a set of longitudinally spaced openings 10 which are alinable with similarly formed openings 11 in the rim 3 for the reception of attaching bolts 12. These cleats 8 extend the full width of the rim 3 and as shown in Fig. 1 have their opposite ends overlapped so as to provide a continuous ground-engaging portion which eliminates vibration and jolting of the tractor or other machine mounted on wheels of this type. The radial flange 13 of each grouser increases in width toward the outer side of the rim 3 so as to arrange the outer longitudinal edge in a common plane with the periphery of the rim flange 7.

By reference to Fig. 1, it will be noted that the tractor wheels have their flanges declined outwardly with the result that the weight of the tractor or other machine and the wheels will force the soil outwardly and prevent packing thereof between the grousers or cleats. With the cleats or grousers 8 arranged as shown, their first contact with the ground is at the narrow end of the grouser and incidentally the greatest diameter of the wheel rim, while the last ground contact is at the wide end of the grouser and smallest diameter of the wheel rim, this structure forming substantially V-shaped pockets from which the soil is forced in a straight line due to the weight of the tractor. Should the soil conditions warrant it, I may duplicate the flange structure 5 at the outer side of the wheel rim to further prevent catching roots. The rim flange 5 extends into the earth and prevents side slipping of a tractor or other machine on a hillside and further serves to prevent locking of roots or the like article between the grousers or cleats. Ordinarily, the cleats extend from the rim and are free to engage roots or the like and the result is that the wheels are locked against forward movement and the tractor often turns over and seriously injures the driver. By giving the grousers or cleats a substantially triangular shape and overlapping the ends as has been stated, they co-act with the rim flange in assisting in preventing the tractor from slipping sideways on a hillside, it being noted that through this overlapping feature, a continuous ground contacting portion is provided.

The arrangement of the grousers or cleats on the rim 3 is such that when a tractor is operating on a hillside, the lower drive wheel grousers present a maximum anti-slipping surface to the soil since most of the weight of the tractor is on the lower wheel and this lower wheel with these grousers attached thereto will propel the tractor forward as well as prevent the side slipping which when the tractor is drawing a plow, often allows one plow share to run in an open furrow.

By separably connecting the rim flange and the several grousers or cleats to the rim 3, I have provided a structure in which repair work is greatly facilitated. Excellent results have been obtained through using the details as shown and described and they are preferably followed, but it is understood that such changes as may fall within the scope of the appended claims, I consider within the spirit of this invention.

I claim:

1. A wheel comprising a relatively wide transversely inclined flat rim, a radially outwardly extending flange at the side of the rim of greater diameter, and a set of transversely inclined grousers fixed to the outer face of said rim.

2. A structure as specified in claim 1; said grousers having their outer edges arranged in a common plane with the periphery of the flange.

3. A wheel including a flat rim decreasing in external diameter from one side to the other, a radial outwardly extending flange bolted to the side of the rim of greater diameter, and a set of grousers being inclined transversely to overlap one another and provide a continuous ground-contacting portion, and having their outer edges disposed in a common plane with the periphery of the flange.

4. A tractor wheel including a transversely inclined rim having an inturned annular attaching flange at the side of greater diameter, a rim flange removably secured to the attaching flange and extending radially beyond the rim, and a set of transversely inclined grousers removably fixed to the outer side of the rim, transversely opposed ends of the grousers being circumferentially overlapped to provide a continuous ground-engaging portion, said grousers having their outer edges transversely alined with the rim flange periphery.

In testimony whereof I have hereunto affixed my signature.

PAUL F. LEVERENZ.